US012768407B2

(12) United States Patent
Pendesini et al.

(10) Patent No.: US 12,768,407 B2
(45) **Date of Patent: *Oct. 20, 2026**

(54) BAND SPRING FOR RETURNING BRAKE PADS ON A CALIPER

(71) Applicant: BREMBO S.p.A., Curno (IT)

(72) Inventors: Alberto Pendesini, Curno (IT); Stefano Zaghi, Curno (IT); Davide D'Alessio, Curno (IT)

(73) Assignee: Brembo S.p.A., Curno (IT)

( * ) Notice: Subject to any disclaimer, the term of this patent is extended or adjusted under 35 U.S.C. 154(b) by 481 days.

This patent is subject to a terminal disclaimer.

(21) Appl. No.: 18/261,502

(22) PCT Filed: Jan. 13, 2022

(86) PCT No.: PCT/IB2022/050252

§ 371 (c)(1),
(2) Date: Jul. 14, 2023

(87) PCT Pub. No.: WO2022/153206

PCT Pub. Date: Jul. 21, 2022

(65) Prior Publication Data

US 2024/0110603 A1 Apr. 4, 2024

(30) Foreign Application Priority Data

Jan. 18, 2021 (IT) ........................ 102021000000749

(51) Int. Cl.
*F16D 65/00* (2006.01)
*F16D 55/228* (2006.01)
(Continued)

(52) U.S. Cl.
CPC ......... *F16D 65/005* (2013.01); *F16D 55/228* (2013.01); *F16D 2055/0041* (2013.01); *F16D 2127/02* (2013.01)

(58) Field of Classification Search
CPC ..................................................... F16D 65/005
See application file for complete search history.

(56) References Cited

U.S. PATENT DOCUMENTS 8,616,349 B2 12/2013 Kang
9,046,143 B2 6/2015 Barland
(Continued)

FOREIGN PATENT DOCUMENTS

DE 10233446 A1 * 2/2004 ......... F16D 65/0972
DE 102017222639 A1 8/2018
(Continued)

OTHER PUBLICATIONS

European Patent Office, International Search Report, issued in PCT/IB2022/050252, Apr. 5, 2022, Rijswijk, NL.
(Continued)

*Primary Examiner* — Melody M Burch
(74) *Attorney, Agent, or Firm* — Marshall & Melhorn, LLC

(57) ABSTRACT

A band spring arranged straddling a brake disc to apply an elastic action on a brake pad to bias the brake pad away from the brake disc is provided. The brake pad has a backing plate supporting friction material and having a plate edge forming at least one thrust portion and at least one striker portion. The band spring has a band-shaped spring body and three portions, at least two of which mutually distinct, namely a first coupling portion coupling the band spring to a caliper body, a second thrust portion applying an elastic action on the at least one thrust portion and a third abutment portion forming a support that prevents sliding of the second thrust portion when the band spring is subject to external actions, the third abutment portion, when abutting against the striker portion being biased by a peak or buckling load, avoiding that the band spring permanently couples with the brake pad.

10 Claims, 21 Drawing Sheets

(51) Int. Cl.

| | |
|---|---|
| *F16D 55/00* | (2006.01) |
| *F16D 127/02* | (2012.01) |

(56) References Cited

U.S. PATENT DOCUMENTS

| | | | |
|---|---|---|---|
| 10,066,687 | B2 | 9/2018 | Barland |
| 10,228,033 | B2 | 3/2019 | Barland |
| 10,378,597 | B2 | 8/2019 | Choi |
| 10,808,780 | B2 | 10/2020 | Ryu |
| 2004/0074716 | A1 | 4/2004 | Brumfield et al. |
| 2013/0291418 | A1 | 11/2013 | Mallmann et al. |
| 2018/0003251 | A1 | 1/2018 | Teruzzi et al. |

FOREIGN PATENT DOCUMENTS

| | | | | | |
|---|---|---|---|---|---|
| DE | 102017204696 | A1 | | 9/2018 | |
| EP | 1881472 | B1 | | 1/2009 | |
| EP | 2018490 | B1 | | 2/2020 | |
| EP | 3680504 | A1 | | 7/2020 | |
| JP | 2004176868 | A | | 6/2004 | |
| JP | 4028347 | B2 | * | 12/2007 | |
| JP | 5715932 | B2 | | 5/2015 | |
| KR | 20170083288 | A | | 7/2017 | |
| KR | 20170139879 | A | | 12/2017 | |
| WO | 201118815 | A1 | | 2/2011 | |
| WO | WO-2019049539 | A1 | * | 3/2019 | ........... F16D 55/228 |
| WO | 2019243934 | A1 | | 12/2019 | |
| WO | 2019243936 | A1 | | 12/2019 | |
| WO | 2019243958 | A1 | | 12/2019 | |
| WO | 2020059823 | A1 | | 3/2020 | |
| WO | 2020128710 | A1 | | 6/2020 | |
| WO | 2020129012 | A1 | | 6/2020 | |
| WO | 2020231145 | A1 | | 11/2020 | |
| WO | 2021215436 | A1 | | 10/2021 | |

OTHER PUBLICATIONS

Italian Patent and Trademark Office Search Report in Application No. IT202200018414, dated Apr. 24, 2023—7 pages.

* cited by examiner

BAND SPRING FOR RETURNING BRAKE PADS ON A CALIPER

FIELD OF THE INVENTION

The present invention relates to a band spring for a disc brake device, and a band spring and brake pad assembly, and an operating method of a band spring.

BACKGROUND ART

In a disc brake, the brake caliper is generally arranged straddling the outer peripheral margin of a brake disc, adapted to rotate about a rotation axis (X-X) defining an axial direction (A-A). In a brake disc, there are defined a radial direction (R-R) substantially orthogonal to said axial direction (A-A), a circumferential direction (C-C) orthogonal to both said axial direction (A-A) and said radial direction (R-R), and a tangential direction (T-T) locally, or rather punctually, i.e., in an intersection point of an axial and radial direction, orthogonal to both said axial direction (A-A) and said a radial direction (R-R).

As known, disc brake discs comprise a bell adapted to associate the disc with a hub of a vehicle, from which an annular portion, referred to as a braking band, extends, which is intended to cooperate with brake pads of a caliper.

Disc brake springs are known which consist of a central portion and two end portions, in which the end portions rest against the pads to bias the pads elastically away from each other to ensure a separation of the pads from the brake disc after each braking operation.

The known springs are thus used to obtain a three-fold action:

- to reduce the vibrations of the pads;
- to distance the pads from the brake disc to reduce or eliminate a residual braking torque (residual torque) due to undesired contacts between the pads and the brake disc with the brake deactivated;
- to obtain uniform wear of the friction linings of the pads.

Usually, the known springs are kept in their operating position by fixing the central portion of the springs to the caliper.

In particular, the springs of the prior art generally comprise one or more connecting appendages, formed at the central portion of the expansion spring, adapted to connect the springs to the caliper at coupling portions formed on the caliper.

For example, document DE102017204696 shows a solution of this type.

The springs of the prior art usually abut against an apical portion of the pads and, consequently, transmit a direct distancing force to the pads at the top of the pads, top which is understood as the radially outer edge relative to the rotation axis of the brake disc.

In braking systems of the prior art, the correct positioning between the disc brake components, in particular between the spring and the brake pads, is entrusted to the friction forces which are generated by virtue of the elastic force, which can be generally broken down along the three spatial directions, which the spring applies as a result of its deformation on the support, i.e., the pad plate.

The value of these frictional forces depends on:

- the materials in contact which define the friction coefficient;
- the value of the exchanged spring elastic force.

If the system is subjected to external forces, e.g., vibrations or involuntary contact with an external agent or during maintenance of the caliper or a generic force external to the system, it breaks down along the two main directions which are parallel and perpendicular to the geometry in the contact zone.

The balance between the spring and the pad remains so if the friction forces developed, by virtue of the contact forces, are greater than the sliding forces of the spring on the pad.

Otherwise, the system is perturbed, taking itself to a new balance position different from the first one, which changes the dynamics of the forces exchanged with consequent impact on the functionality of the spring-pad assembly, altering the correct functionality of the braking system.

Therefore, the need is strongly felt to constrain the movement of the spring relative to the brake pad, when the spring-pad assembly is subject to external forces.

The need is felt in particular for band springs (e.g., as known from documents WO2019/243958 and WO2020/128710), which work in contact with a substrate where elastic-type forces are exchanged. Other solutions are known from WO2019243958, WO2020128710, WO2019243934, WO2019243936, WO201118815, WO2020129012, US20180003251, WO2020129012, DE102017222639, JP2004176868A.

In particular, the need is still strongly felt to ensure that the position of the spring-pad contact point does not change as a result of external biases applied to the system.

Solution

It is an object of the present invention to provide a band spring in which the capability of guaranteeing that the position of the spring-pad contact point does not change even as a result of external biases applied to the system is guaranteed.

These and other objects and advantages are achieved by a band spring as described and claimed herein.

Some advantageous embodiments are also described.

By virtue of the suggested solutions, the need to guarantee that the position of the spring-pad contact point does not change even following external biases applied to the system is fulfilled directly by the concerned components by means of the introduction of geometric changes to the band spring.

For example, by obtaining the band spring through an industrial process of blanking, bending, etc., the desired requirements are achieved directly with the component concerned with the problem, i.e., the band spring, by virtue of a geometry such as to counteract the sliding force.

The object of such a geometry is to minimize the sliding component generated by the external force while at the same time maximizing the other component, i.e., the contact force which generates a further increase in the friction force compared to the current condition.

The desired effect is obtainable by means of the claimed band spring geometries which allow the invention to be adapted according to the substrate or zone on which the spring is to act.

All the disclosed solutions have the advantage of not biasing the functionality of the wheel-pad assembly and of creating a progressively increasing gap with the support as the latter advances with pad wear.

The suggested spring geometry does not affect the behavior of the spring itself because in working conditions the abutment portion never comes into contact with the support and on the contrary, tends to move away from it as wear advances. Indeed, the portion of the stop is used only during assembly to ensure that the spring is mounted correctly but then in operation must not interact with the support i.e., the plate not to risk biasing the functionality of the spring.

DRAWINGS

Further features and advantages of the band spring will become apparent from the description provided below of preferred exemplary embodiment thereof, given by way of non-limiting example, with reference to the accompanying drawings, in which.

Figure 1:
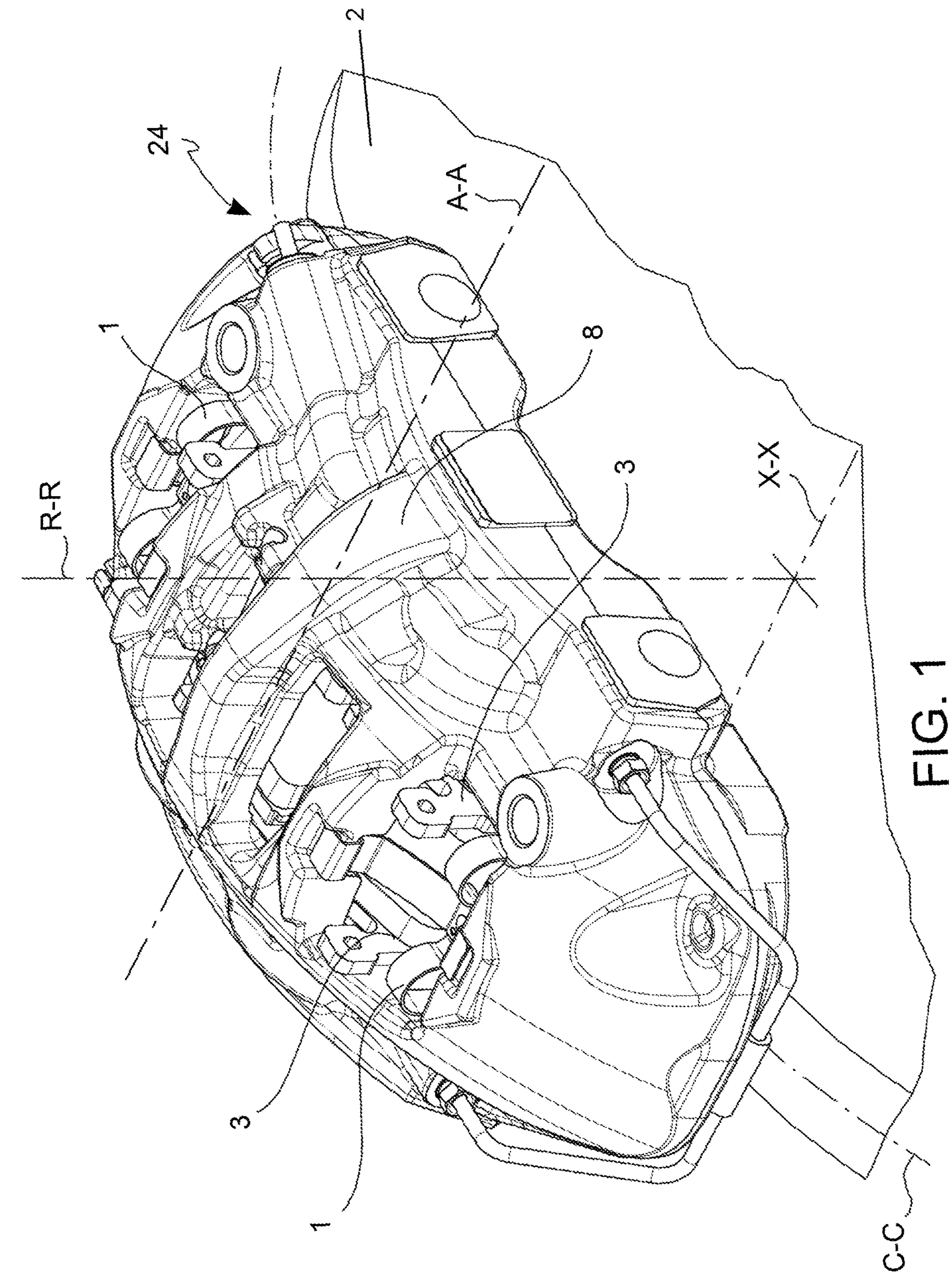
FIG. 1 shows an axonometric view of a brake caliper in which a band spring assembly, according to a first embodiment, and brake pad assembly according to the present invention are provided, in particular, two band springs interacting with two opposite brake pads.
Figure 2:
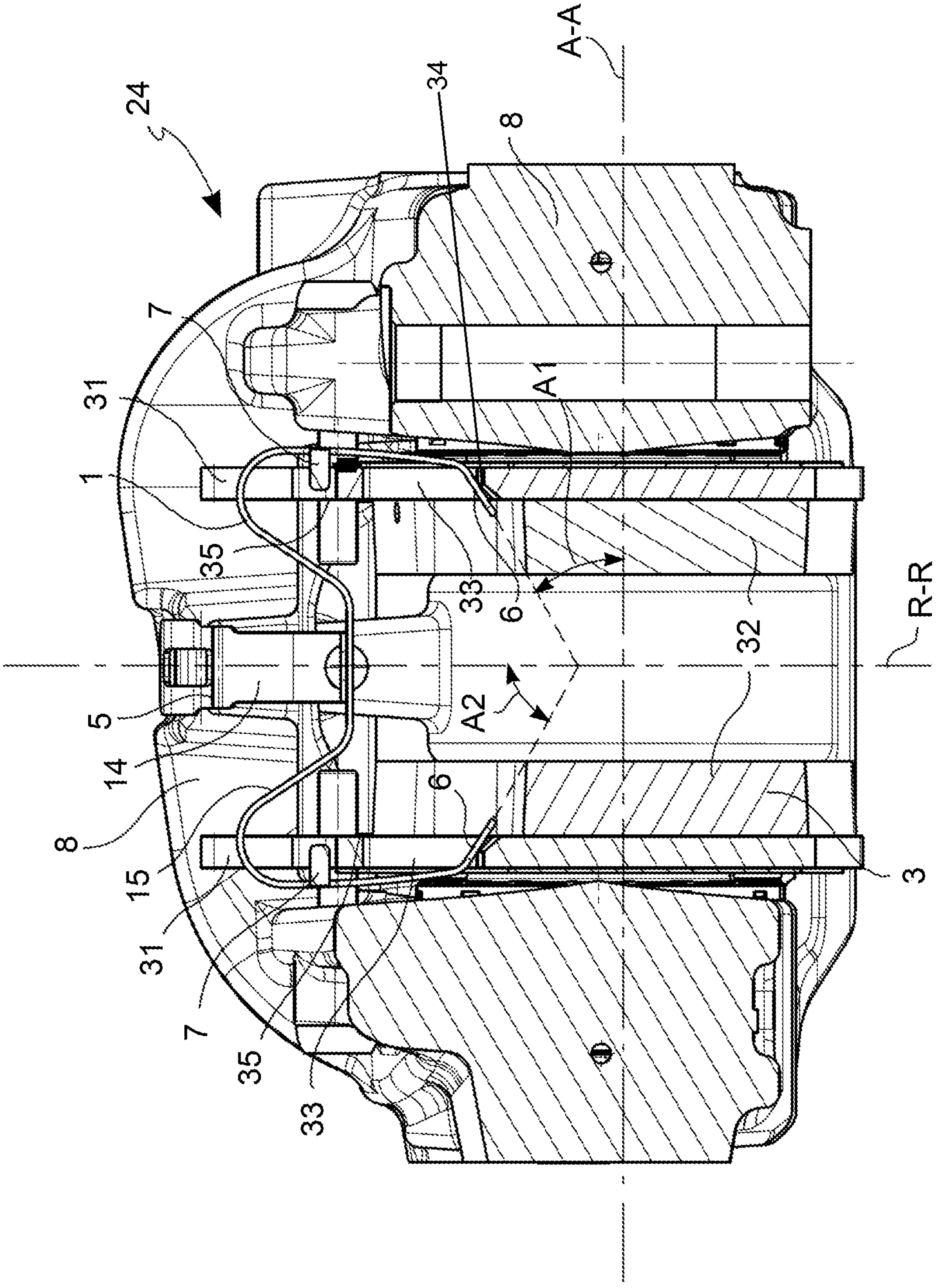
FIG. 2 shows the cross-section view of the brake caliper of FIG. 1 in which the interaction of the band spring with the caliper body and with the brake pad support plate can be seen.
Figure 3:
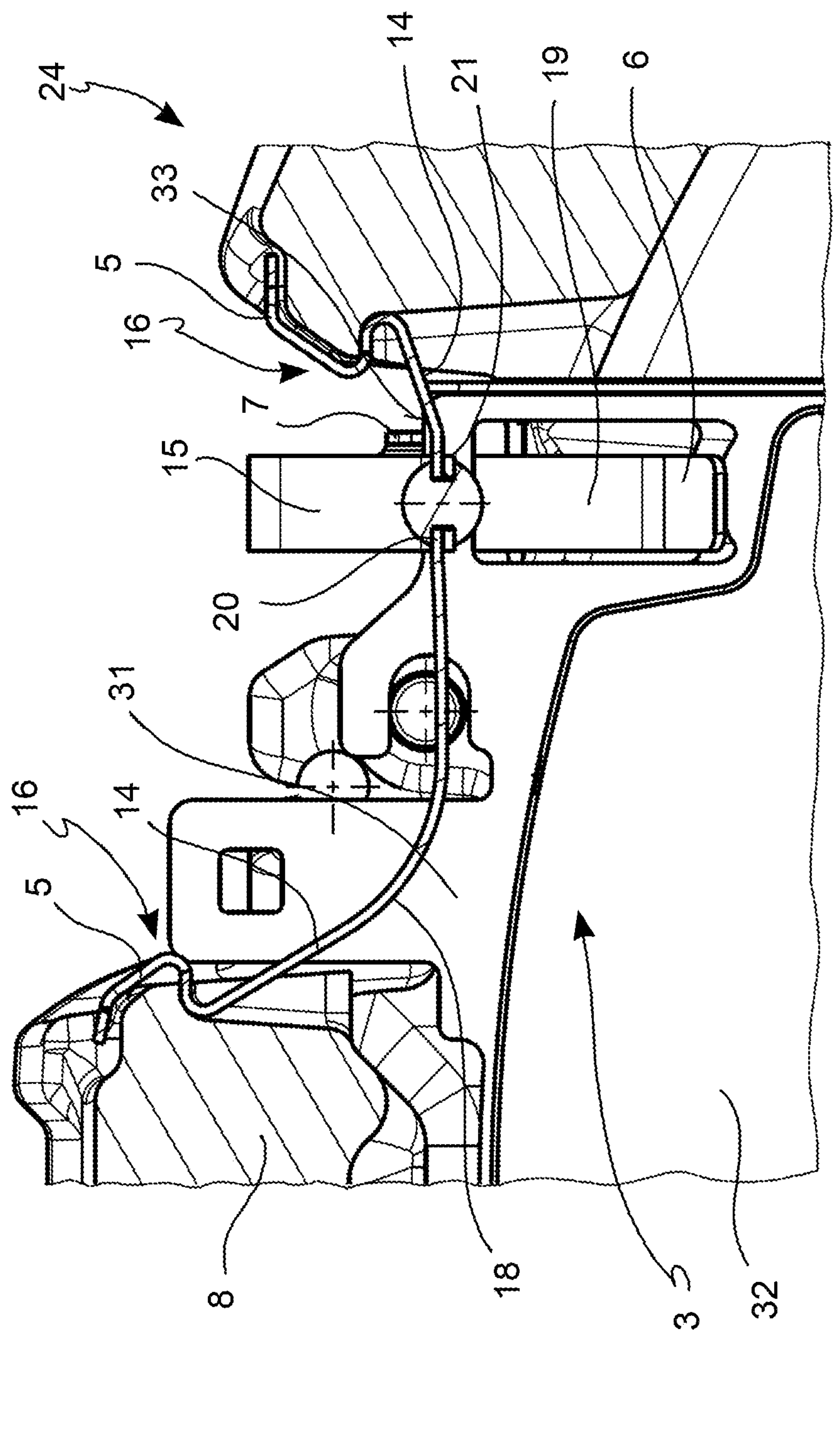
FIG. 3 shows a longitudinal section view of a detail of the caliper in FIG. 1 at the band spring.
Figure 4:
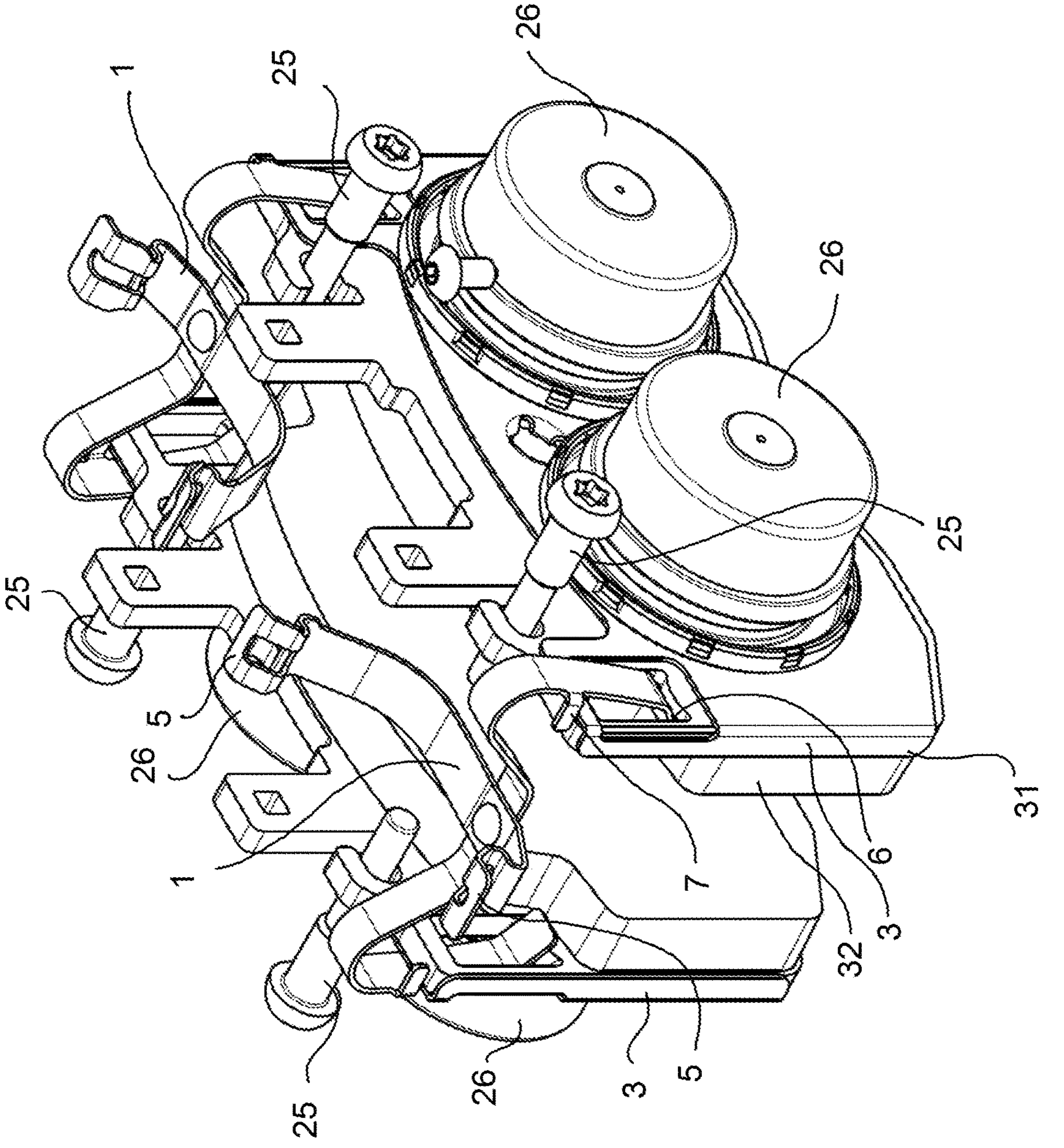
FIG. 4 shows an axonometric view of a pair of band spring and pad assemblies with which the pad supporting and sliding pins and the biasing pistons of the pads of the brake caliper in FIG. 1 are associated.
Figure 5:
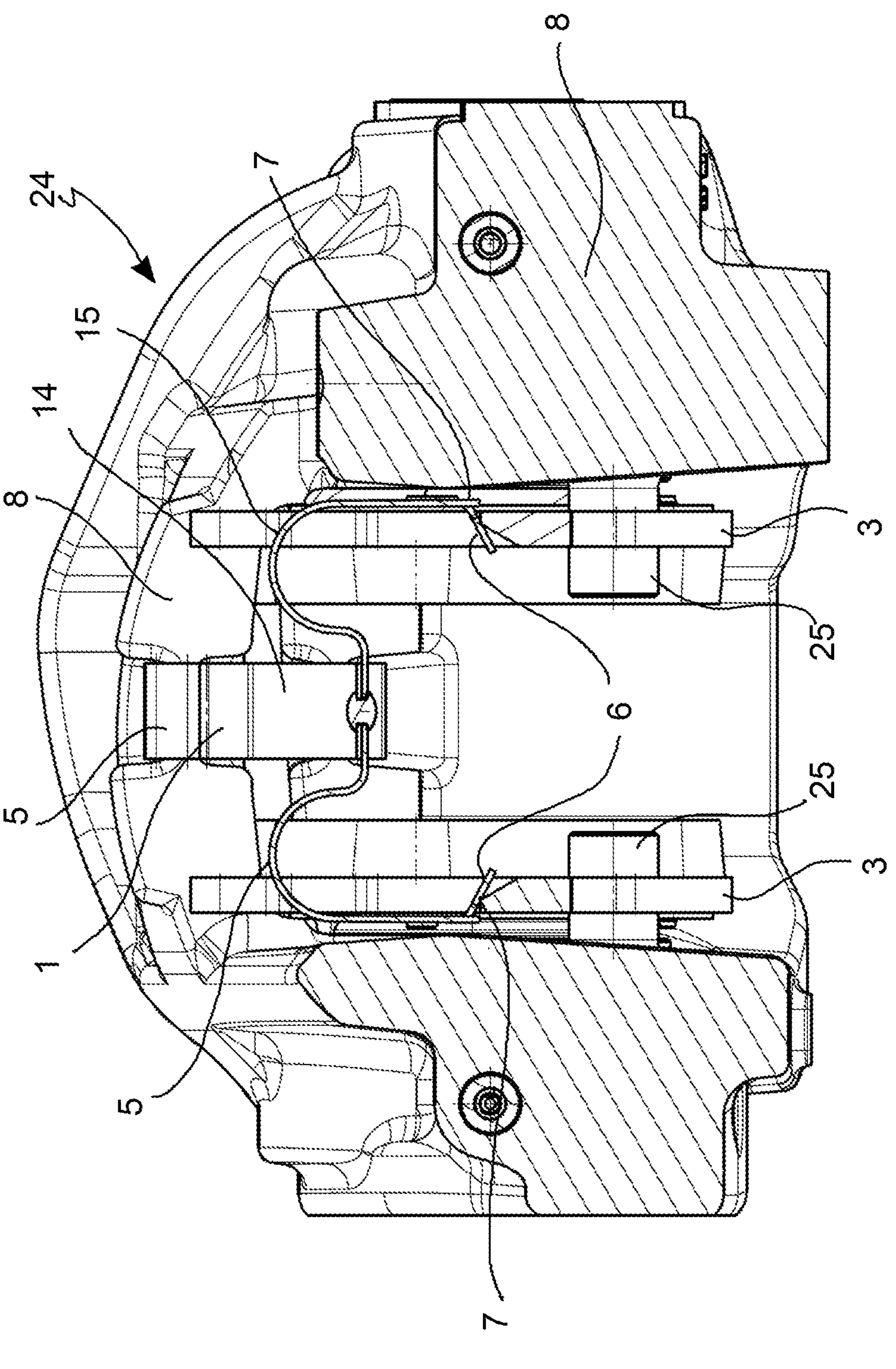
FIG. 5 and FIG. 6 show a cross-section view of a brake caliper with a band spring according to a further embodiment and in two different states of brake pad wear.
Figure 6:
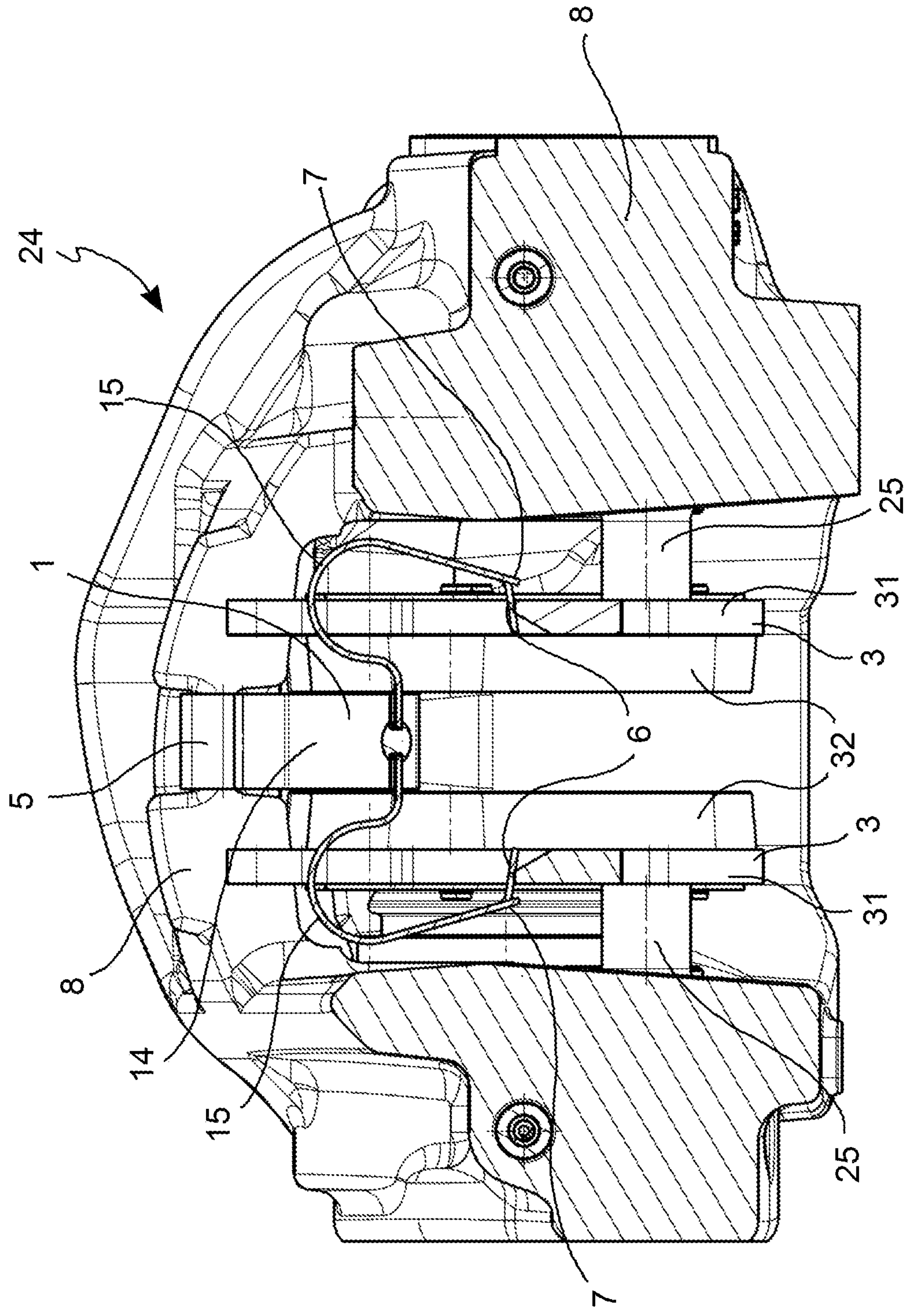
Figure 7:
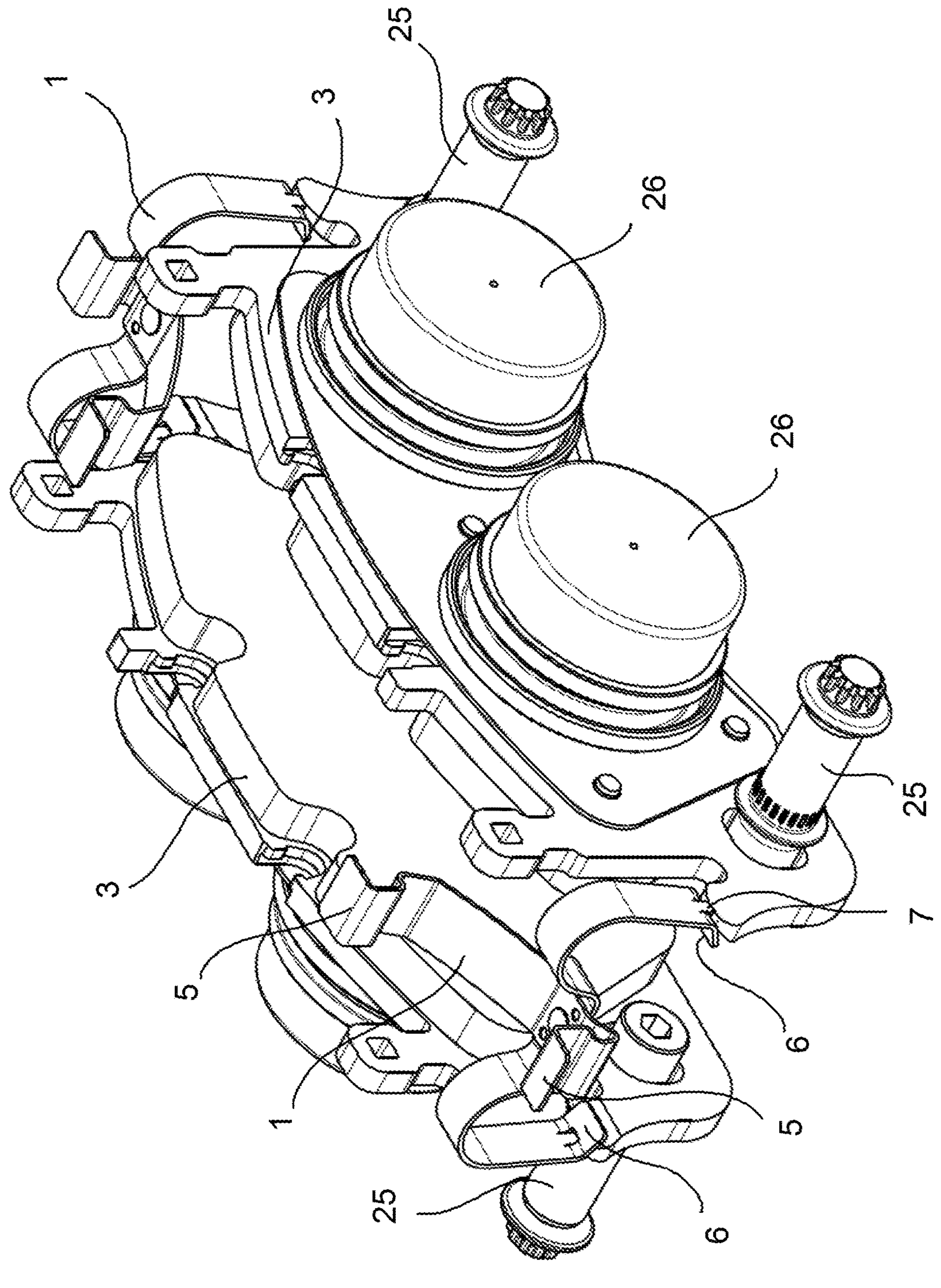
FIG. 7 shows an axonometric view of a pair of band spring and pad assemblies with which the pad support and sliding pins and brake caliper pad biasing pistons in FIGS. 5 and 6 are associated.
Figure 8:
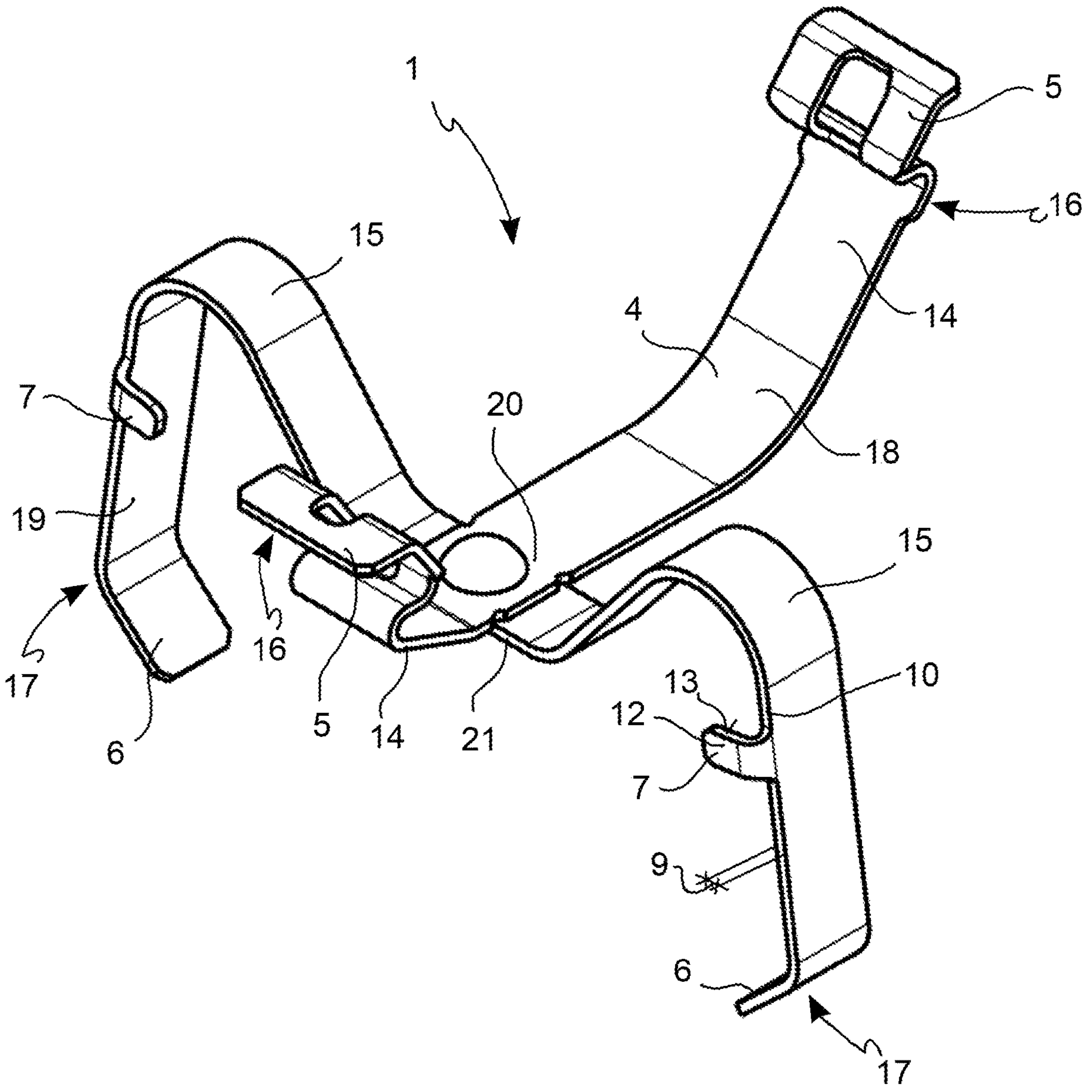
Figure 9:
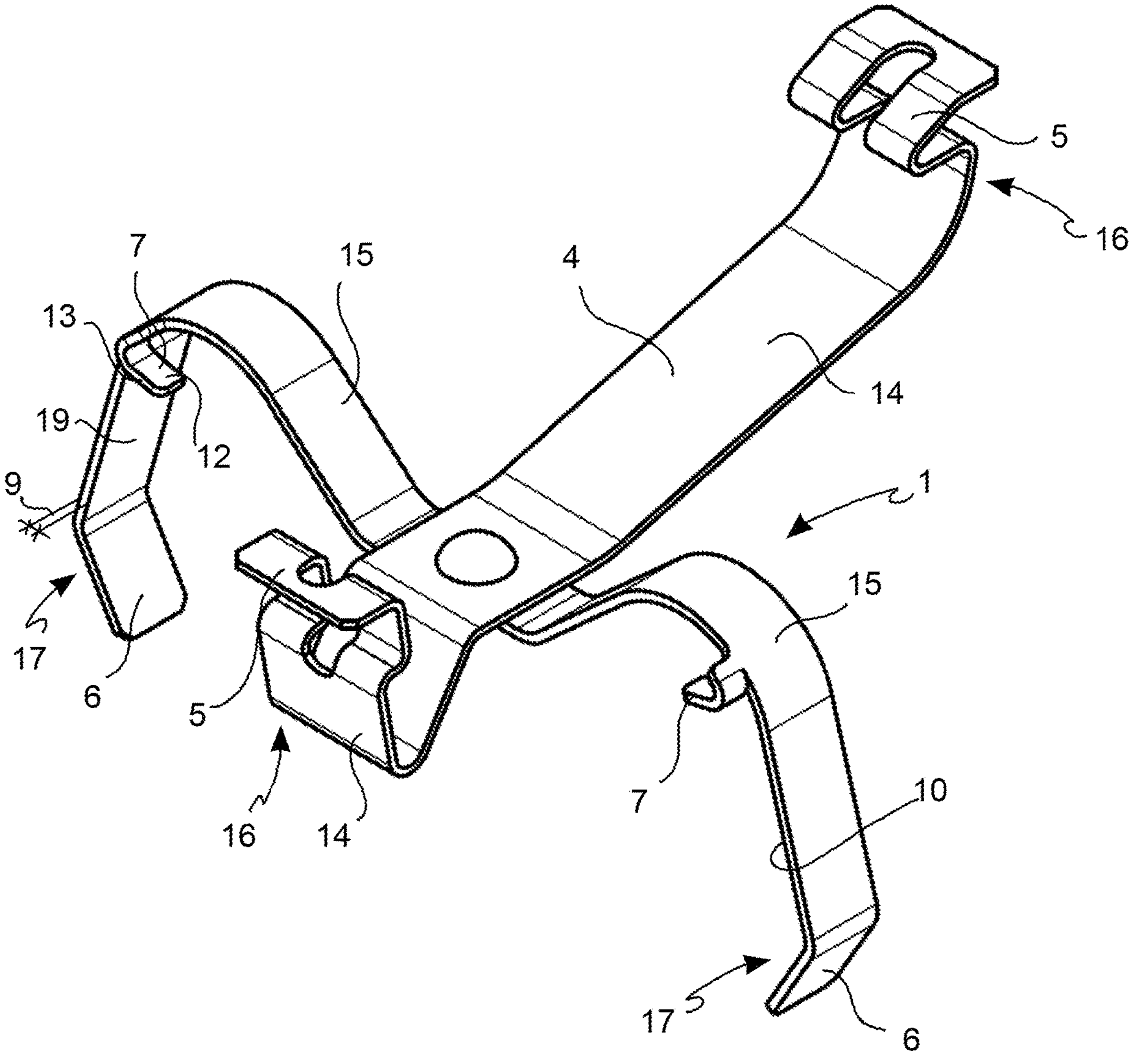
Figure 10:
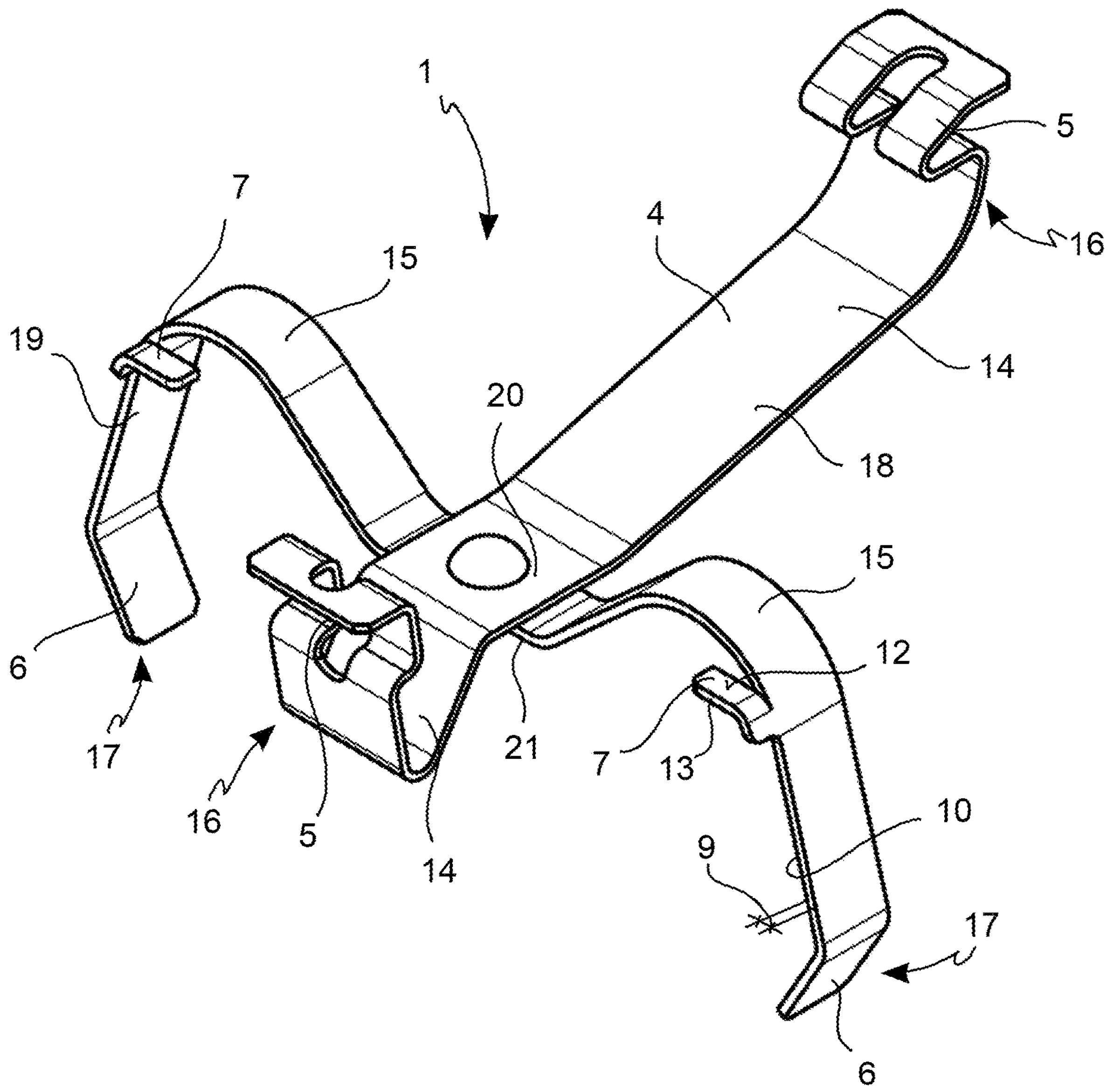
Figure 11:
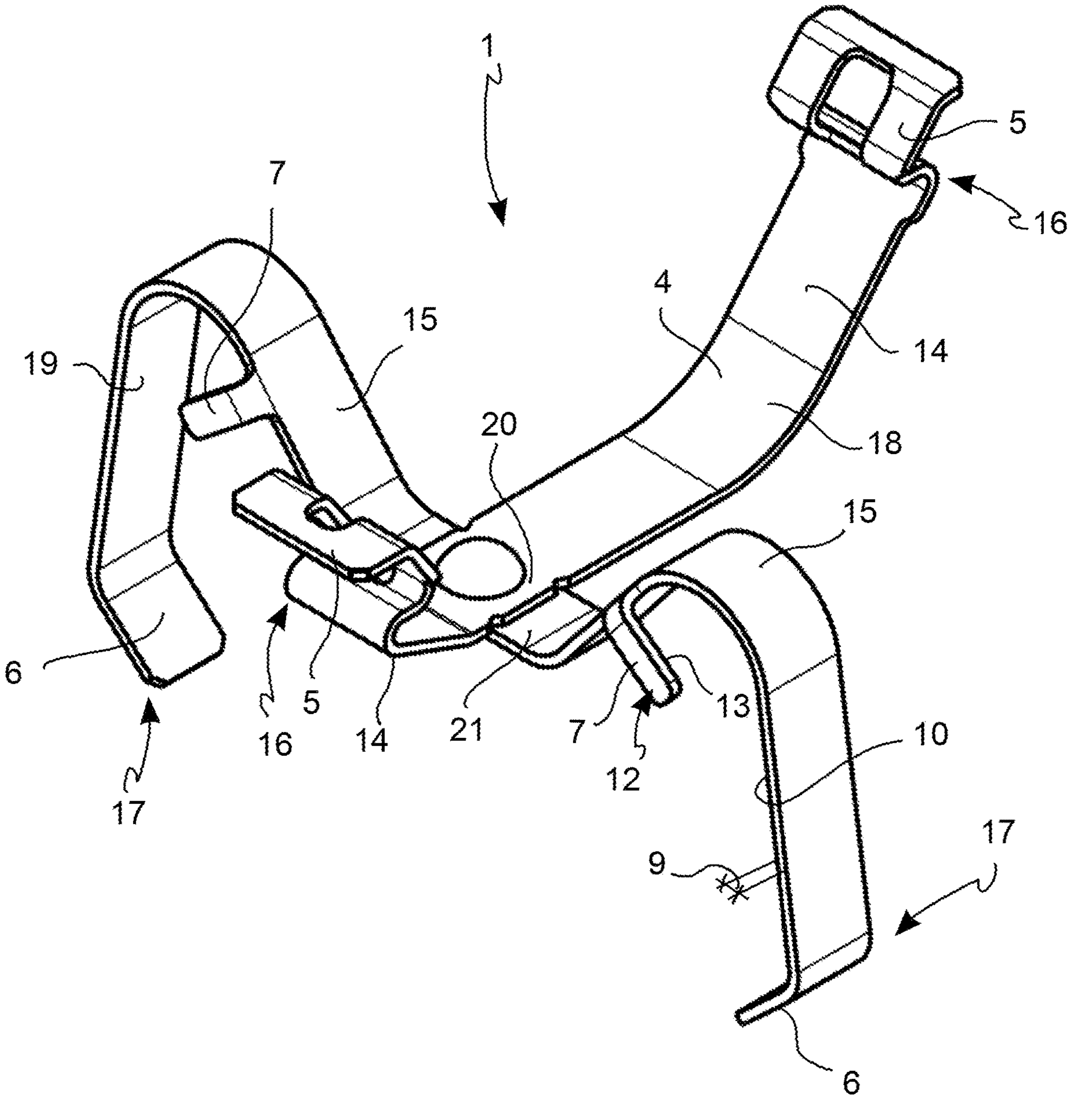
Figure 12:
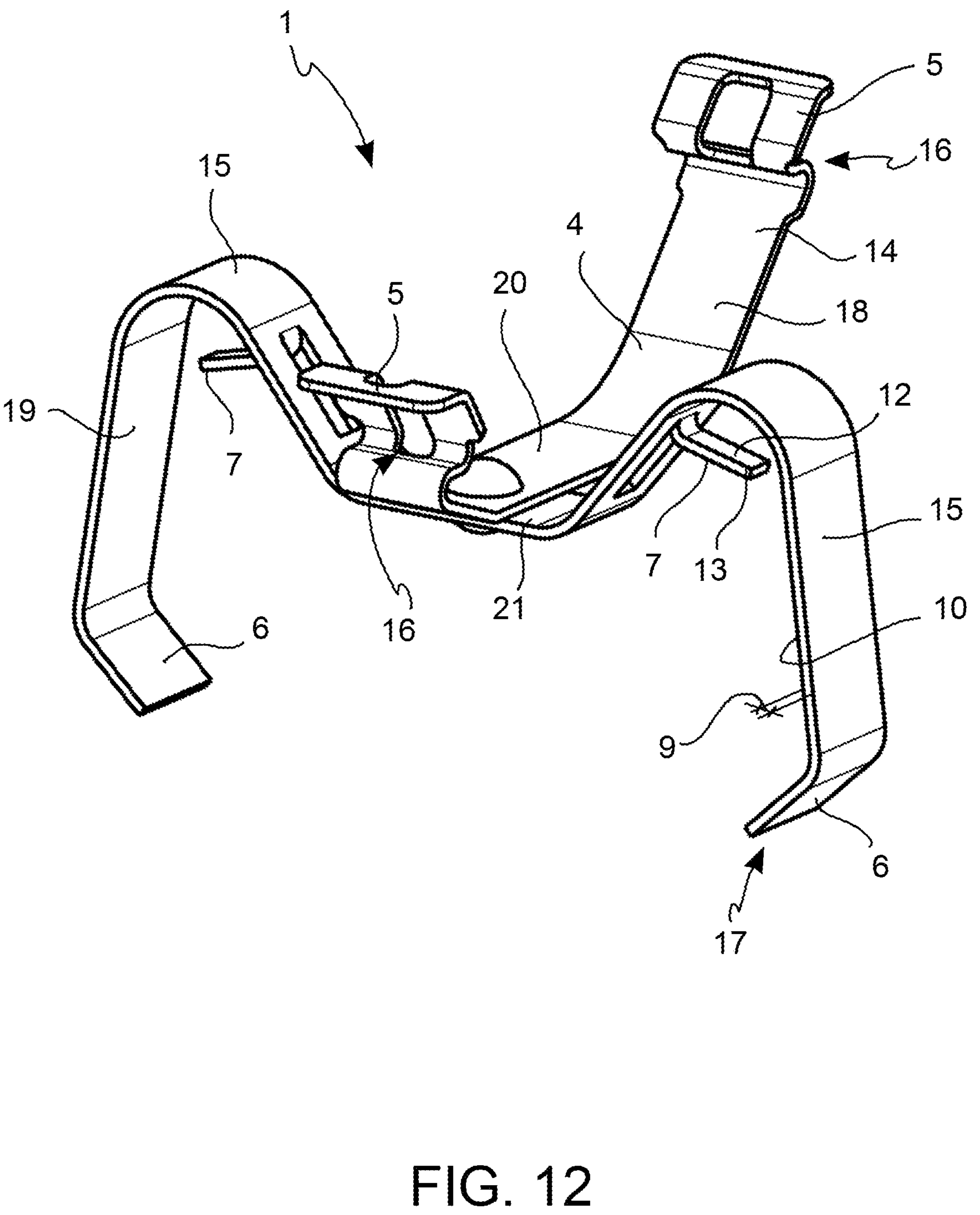
Figure 13:
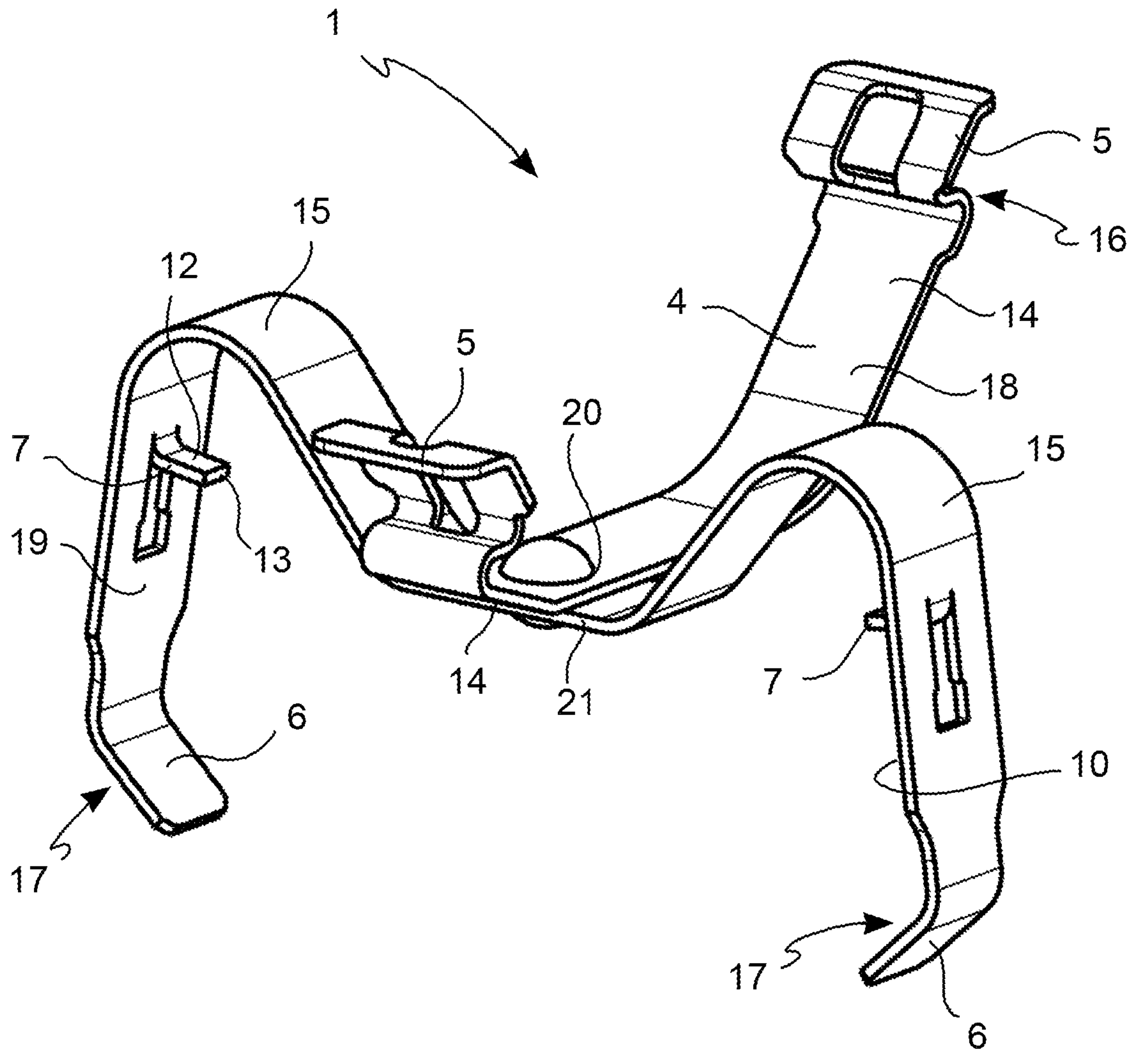
Figure 14:
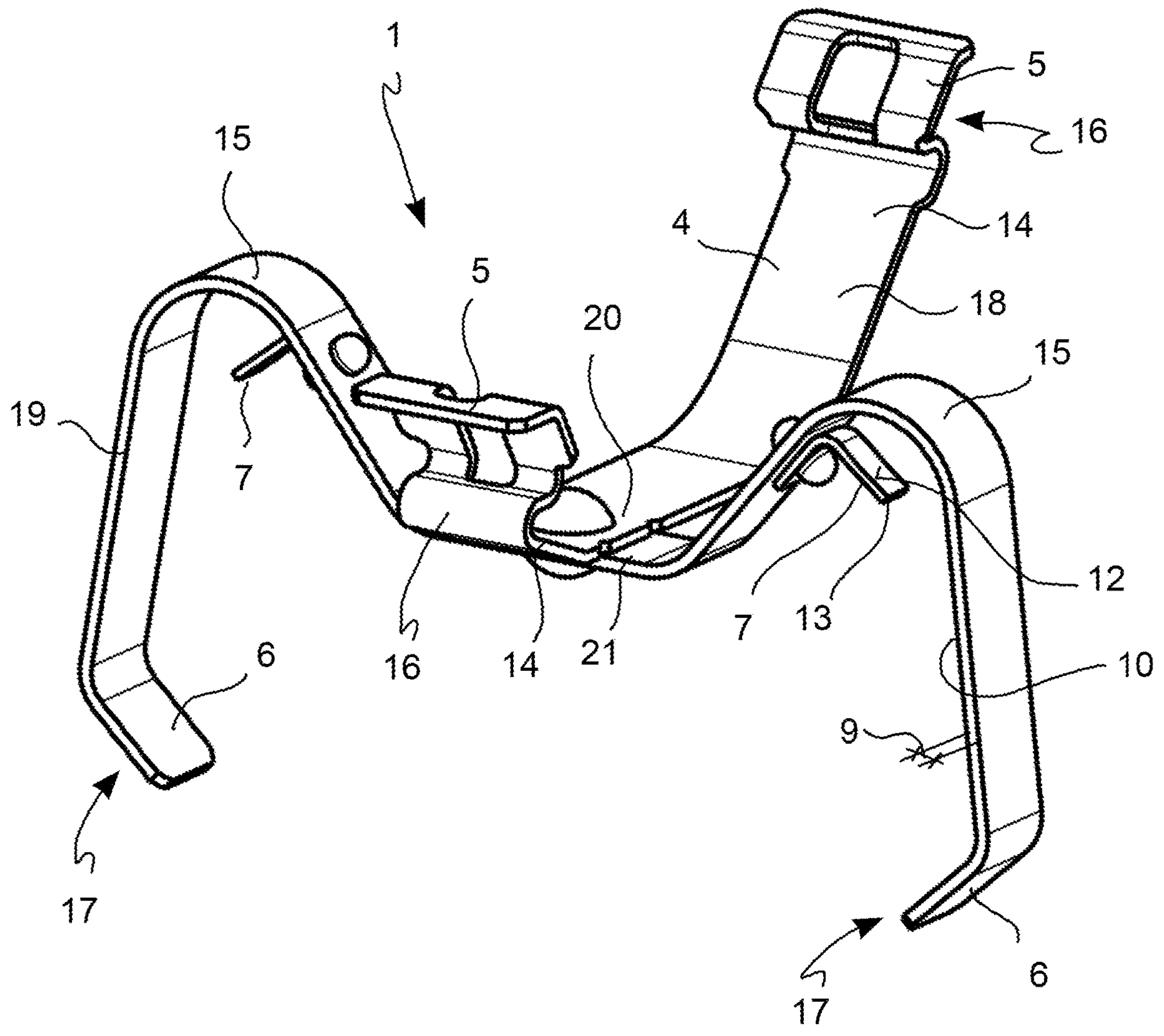
Figure 15:
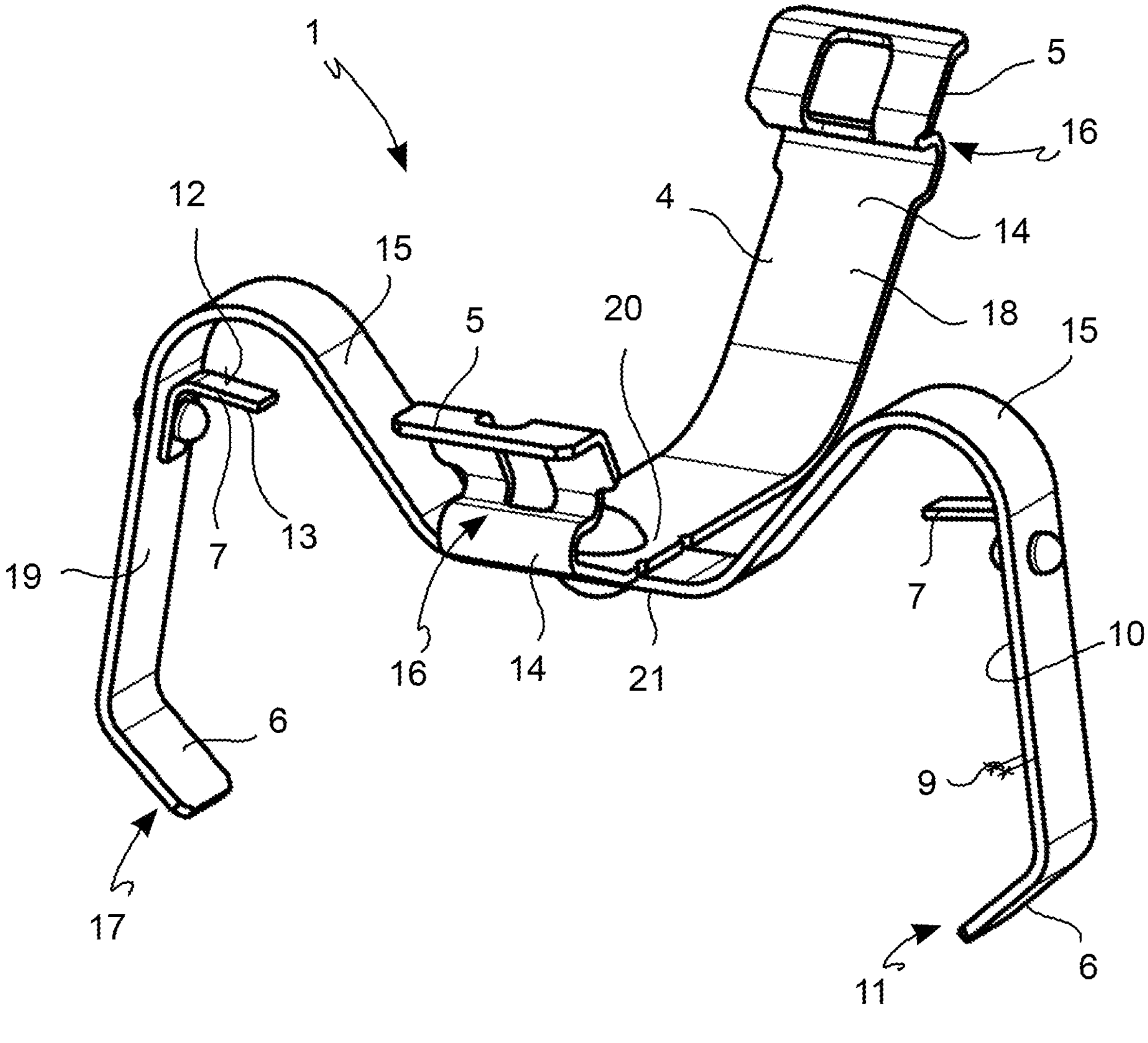
Figure 16:
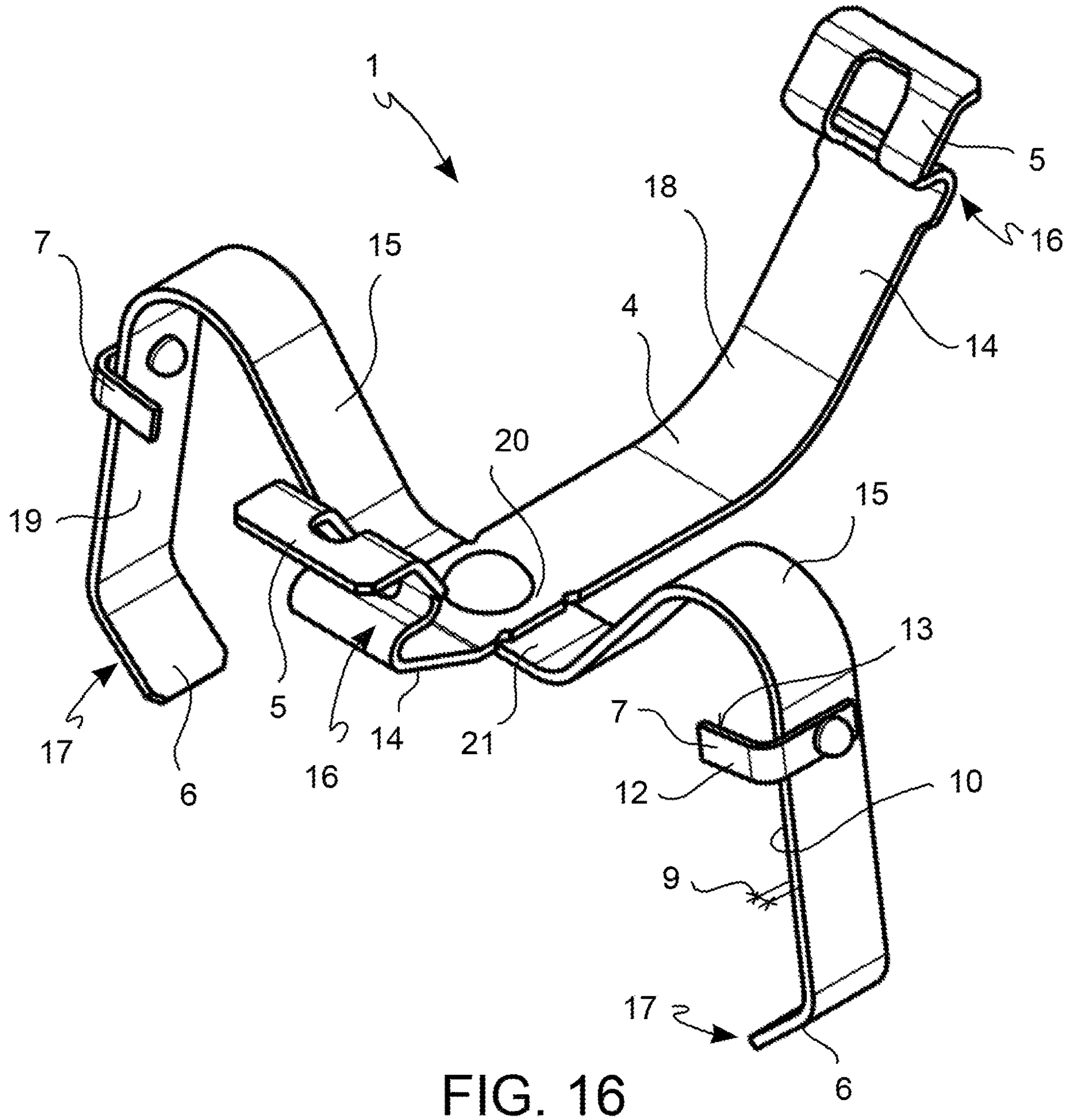
Figure 17:
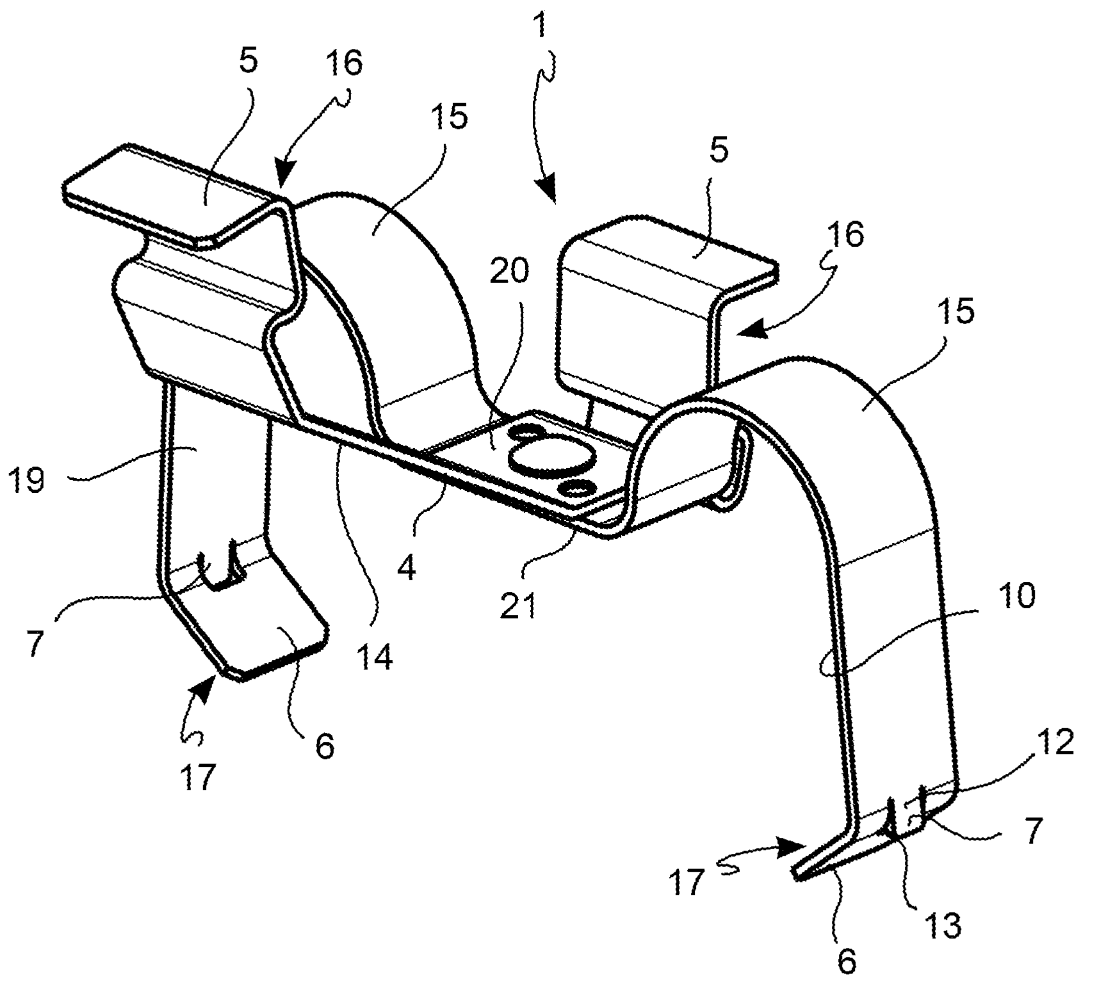
Figure 18:
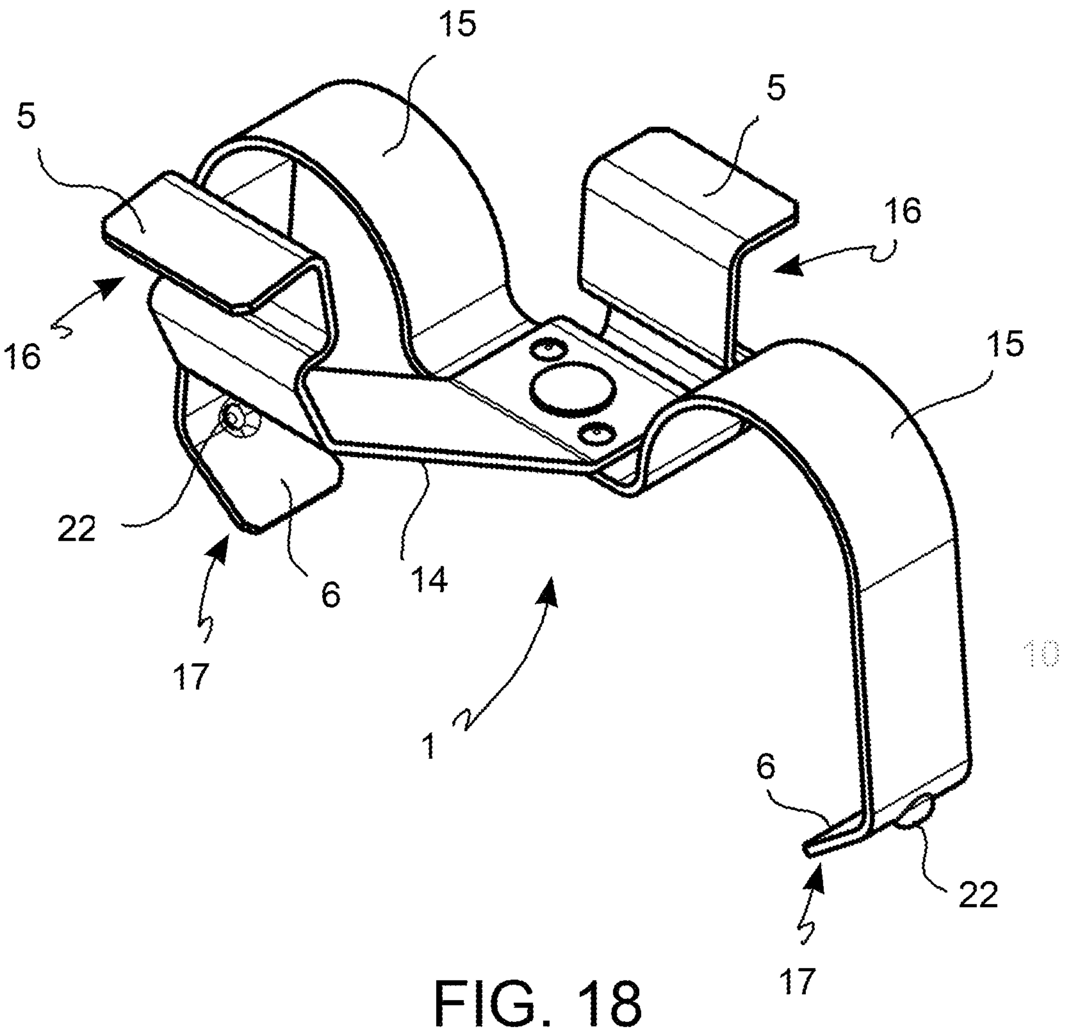
Figure 19:
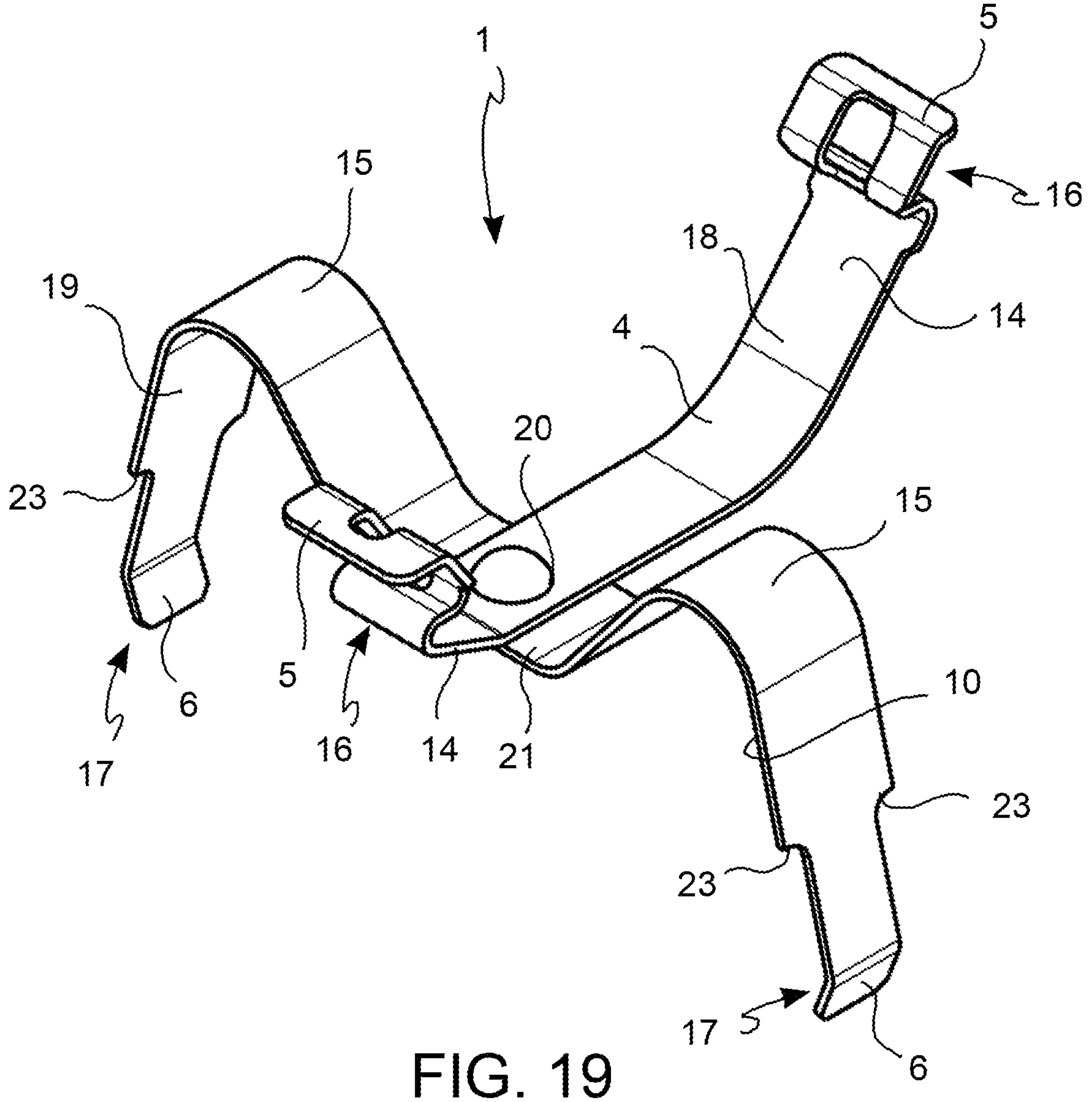
Figure 20:
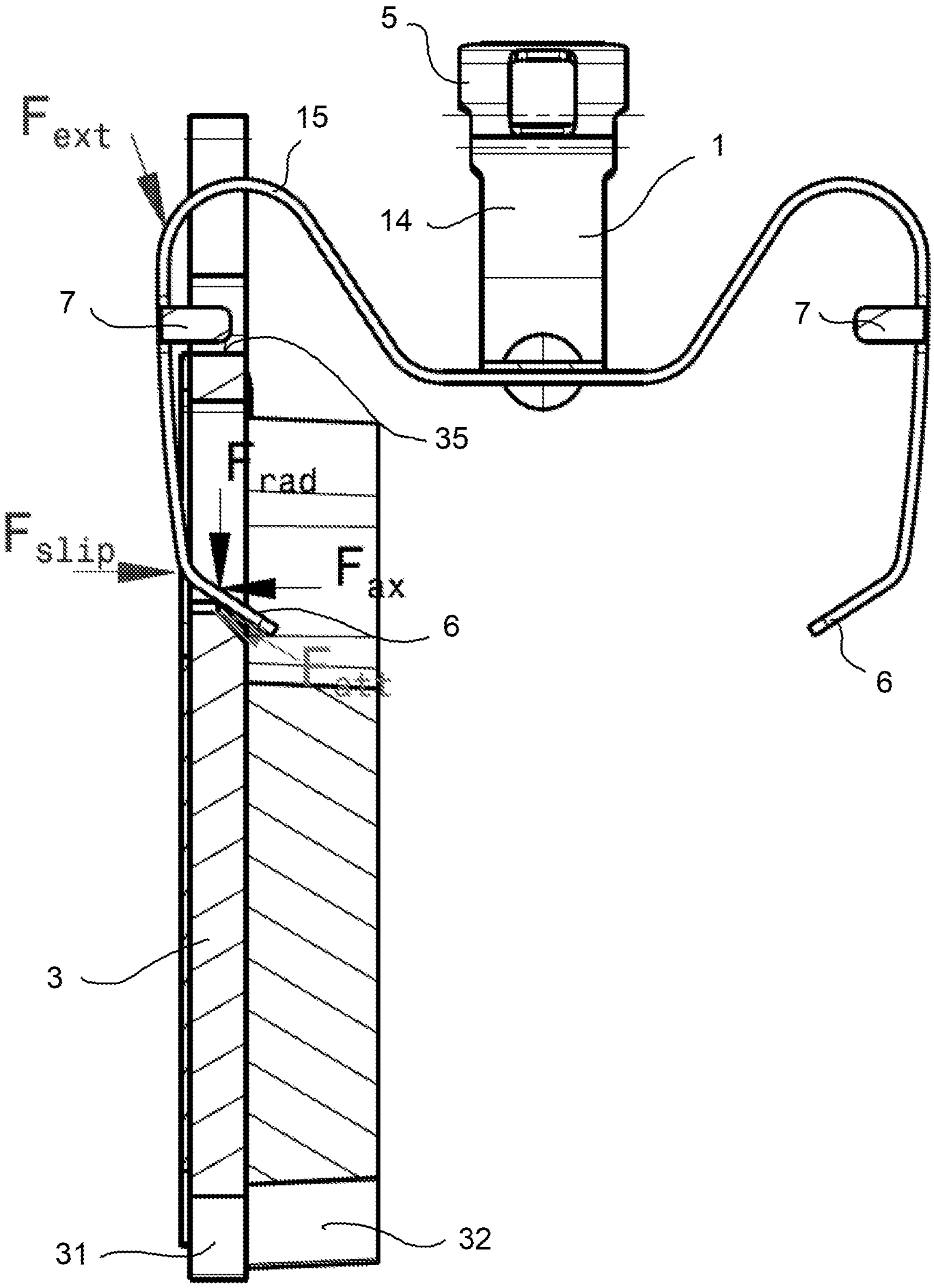
Figure 21:
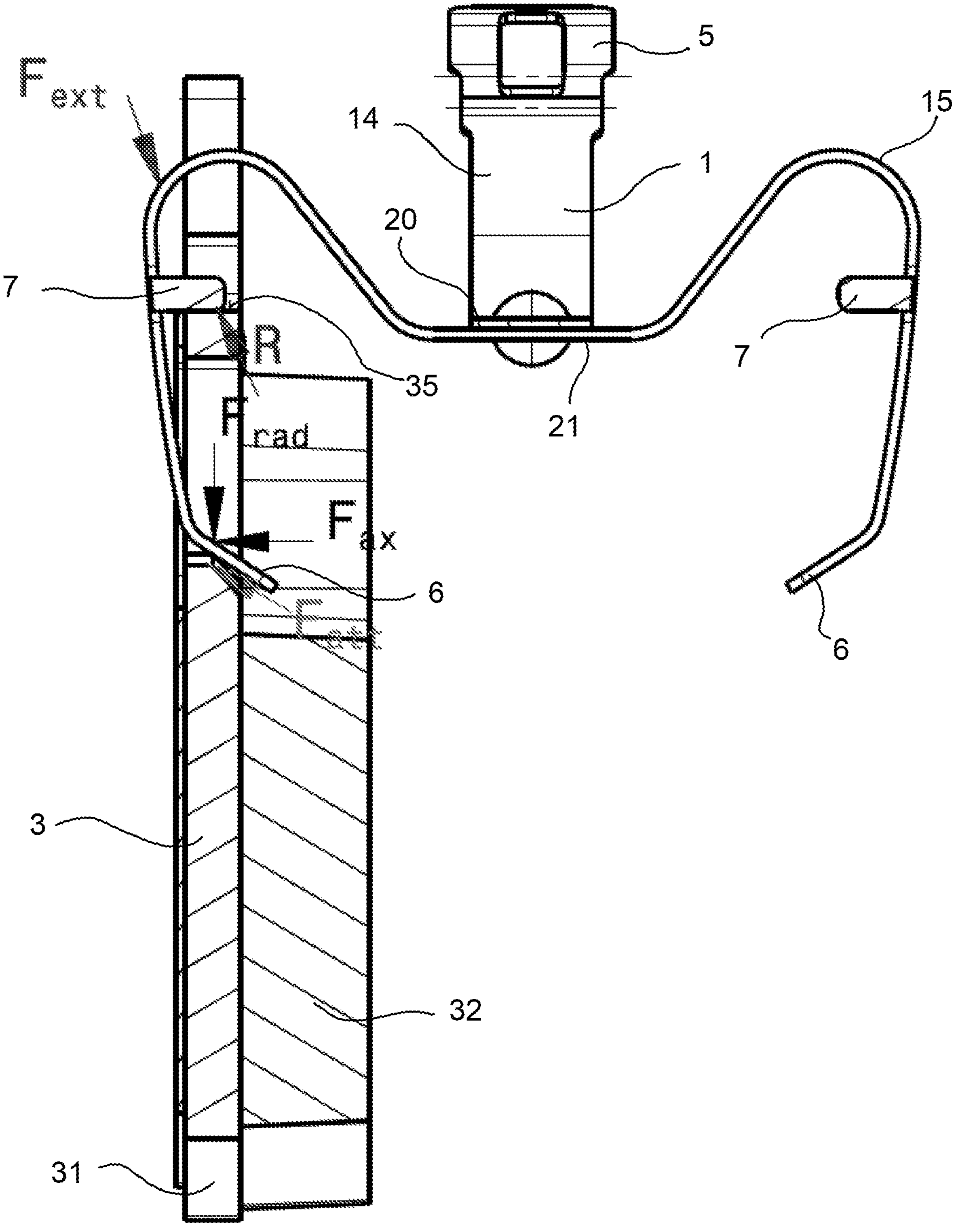

FIGS. from 8 to 19 show an axonometric view of 12 different embodiments of band springs;

FIG. 20 shows in a cross-section view of a brake pad associated with a band spring according to the invention at the beginning of an application of an external force Fext to the spring-brake pad assembly, wherein a sliding force Fslip arises which starts to alter the radial forces Frad and the axial forces Fax exchanged between the spring and the brake pad backing plate which generate the friction force Fatt which maintains the balance between the spring and pad;

FIG. 21 shows a cross-section view of the brake pad in the same assembly in which the external force Fext has overcome the friction force Fatt and displaces the balance between the spring and the brake pad, balance which, however, is not altered by virtue of the abutment portion, i.e. a tongue, of the spring which abuts against a striker portion of the backing plate which generates a binding reaction R which balances and cancels the effect of the external force Fext, allowing the optimal position between band spring and pad to be maintained.

DESCRIPTION OF SOME PREFERRED EMBODIMENTS

According to a general embodiment, a band spring 1 is shaped to be arranged straddling a brake disc 2 to apply an elastic action on at least one brake pad 3 to bias it away from said brake disc 2.

Said brake disc 2 is adapted to rotate about a rotation axis X-X which defines an axial direction A-A parallel to said rotation axis XX, a radial direction R-R, orthogonal to said rotation axis X-X, and a circumferential direction C-C orthogonal to said axial direction A-A and to said radial direction R-R.

Said at least one brake pad 3 comprises a backing plate 31 which supports friction material 32, said backing plate 31 comprising a plate edge 33 which forms at least one thrust portion 34 and a distinct at least one striker portion 35.

Said band spring 1 comprises a band-shaped spring body 4.

Said band spring 1 comprises at least three portions 5, 6, and 7 which are mutually distinct.

A first coupling portion 5 adapted to couple said band spring to a caliper body 8.

A second thrust portion 6 adapted to apply said elastic action on said thrust portion 34 of said at least one brake pad 3 biasing said brake pad 3 at least away from said brake disc 2 in an axial direction A-A and in a radial direction R-R.

A third abutment portion 7 adapted to abut against said striker portion 35 of said at least one brake pad 3 forming a support on an area of said striker portion 35 which prevents any sliding of said second thrust portion 6 when the spring is subject to external actions.

In particular, it is avoided that said band spring 1 permanently engages with said at least one brake pad 3, avoiding a bilateral constraint in said second thrust portion 6 and third abutment portion 7 between said band spring 1 and said at least one brake pad 3.

According to an embodiment, said third abutment portion 7 extends cantilevered from said spring body 4.

According to an embodiment, said third abutment portion 7 comprises third abutment portion opposite flat faces 11, 12, and a third abutment portion edge 13.

According to an embodiment, said third abutment portion 7 rests abutting against said striker portion 35 with one of said third abutment portion opposite flat faces 11 or 12.

According to an embodiment, said third abutment portion 7 comprises third abutment portion opposite flat faces 11, 12, and a third abutment portion edge 13.

According to an embodiment, said third abutment portion 7 rests abutting against said striker portion 35 with said third abutment portion edge 13.

According to an embodiment, said third abutment portion 7, when it rests abutting against said striker portion 35 is biased to bend.

According to an embodiment, said band-shaped spring body 4 is obtained from a shaped and bent blanked sheet of predetermined spring thickness 9 which forms a spring edge 10.

According to an embodiment, said band-shaped spring body 4 is made from a blanked and shaped sheet of spring steel.

According to an embodiment, said spring body 4 of said band spring 1 comprises at least one spring arm 14, 15 of predominantly longitudinal extension comprising at least one spring arm end 16, 17.

According to an embodiment, said at least three portions 5, 6, and 7 are mutually distinct and separated by spring arm portions 14, 15, i.e., stretches of spring body 4 free of constraints, i.e., stretches of spring body 4 which prevent contacting both said caliper body 8 and said at least one brake pad 3.

According to an embodiment, said first coupling portion 5 is a spring body portion 4 placed at the spring arm end 16 of the at least one first spring arm 14.

According to an embodiment, said second thrust portion 6 is a spring body portion 4 placed at the spring arm end 17 of the at least one second spring arm 15.

According to an embodiment, said third abutment portion 7 extends cantilevered from at least a second spring arm 15.

According to an embodiment, said at least one second spring arm 15 is shaped with two branches bent into a U or V.

According to an embodiment, said third abutment portion 7 extends from the branch of said U or V which ends in said second thrust portion 6.

According to an embodiment, said third abutment portion 7 extends from the branch of said U or V away from said second thrust portion 6.

According to an embodiment, said third abutment portion 7 is in one piece with said at least one second spring arm 15.

According to an embodiment, said third abutment portion 7 is connected to at least a second spring arm 15.

According to an embodiment, said third abutment portion 7 is riveted to at least a second spring arm 15.

According to an embodiment, said third abutment portion 7 is a central portion of said at least one second spring arm 15 bent away from said at least one second spring arm 15 forming a window in said at least one second spring arm 15.

According to an embodiment, said third abutment portion 7, when in working conditions and abutting against said striker portion 35, is arranged parallel to said plate edge 33.

According to an embodiment, said third abutment portion 7, when in working conditions and abutting against said striker portion 35, is arranged orthogonal to said plate edge 33.

According to an embodiment, said third abutment portion 7 is a tongue which projects from the edge of said spring body 4 bending orthogonally to said spring body 4.

According to an embodiment, said third abutment portion 7 is a tongue, which projects parallel to said spring body 4 bending its free end away from said spring body 4.

According to an embodiment, said bend is directed towards said second thrust portion 6, or said bend is directed away from said second thrust portion 6.

According to an embodiment, a first spring body band 18 comprises a first connecting portion 20 from which two first spring arms 14 move away.

According to an embodiment, a second spring body band 19 comprises a second connecting portion 21 from which two second spring arms 15 move away.

According to an embodiment, said first connecting portion 20 of said first spring body band 18 is connected to said second connecting portion 21 of said second spring body band 19 to arrange said two first spring arms 14 separated by said two second spring arms 15.

According to an embodiment, said first connecting portion 20 of said first spring body band 18 is connected to said second connecting portion 21 of said second spring body band 19 to arrange said two first spring arms 14 orthogonal to said two second spring arms 15.

According to an embodiment, said first coupling portion 5 is shaped to couple by snapping onto said caliper body 8.

According to an embodiment, said first coupling portion 5 is shaped to engage with said caliper body 8 forming a bilateral constraint of said band spring 1 to said caliper body 8.

According to an embodiment, said second thrust portion 6, when in operating conditions said at least one pad 3 is arranged inclined relative to said axial direction A-A and also relative to said radial direction R-R forming a predetermined angle A1 between said second thrust portion 6 and said axial direction A-A and forming a predetermined angle A2 between said second thrust portion 6 and said radial direction R-R.

The present invention further relates to an assembly comprising at least one band spring 1 according to any one of the embodiments described above and at least one pad disc 3.

The present invention further relates to a method for elastically biasing at least one brake pad 3 away from a brake disc 2; wherein the following steps are provided:

- providing at least one band spring 1 shaped to straddle said brake disc 2 and having a band-shaped spring body 4; wherein
- said brake disc 2 is adapted to rotate about a rotation axis X-X which defines an axial direction A-A parallel to said rotation axis XX, a radial direction R-R, orthogonal to said rotation axis X-X, and a circumferential direction C-C orthogonal to said axial direction A-A and to said radial direction R-R;
- said at least one brake pad 3 comprises a backing plate 31, which supports friction material 32, said backing plate 31 comprising a plate edge 33 which forms at least one thrust portion 34, and at least one distinct striker portion 35.

Said method further comprises the steps of:

- coupling a first coupling portion 5 of said band spring 1 to a caliper body 8;
- placing a second thrust portion 6 of said band spring 1 on said thrust portion 34 of said at least one brake pad 3 and applying said elastic action on said thrust portion 34 by biasing said brake pad 3 at least away from said brake disc 2 in an axial direction A-A and a radial direction R-R;
- in case of external bias to the at least one band spring 1, make a third abutment portion 7 of said band spring 1 abut against said striker portion 35 of said at least one brake pad 3 forming a support on an area of said striker portion 35 and preventing any sliding of said second thrust portion 6 when the spring is subjected to said external actions;
- avoiding that said band spring 1 permanently engages with said at least one pad 3, avoiding a bilateral constraint in said second thrust portion 6 and third striker abutment 7 between said band spring 1 and said at least one pad 3.

According to a further general embodiment, a band spring 1 is shaped to be arranged straddling a brake disc 2 to apply an elastic action on at least one brake pad 3 to bias it away from said brake disc 2.

Said brake disc 2 is adapted to rotate about a rotation axis X-X which defines an axial direction A-A parallel to said rotation axis XX, a radial direction R-R, orthogonal to said rotation axis X-X, and a circumferential direction C-C orthogonal to said axial direction A-A and to said radial direction R-R.

Said at least one brake pad 3 comprises a backing plate 31 which supports friction material 32, said backing plate 31 comprising a plate edge 33 which forms at least one thrust portion 34 and a distinct at least one striker portion 35.

Said band spring 1 comprises a band-shaped spring body 4.

Said band spring 1 comprises at least three portions 5, 6, and 7 at least two of which are mutually distinct.

A first coupling portion 5 adapted to couple said band spring to a caliper body 8.

A second thrust portion 6 adapted to apply said elastic action on said thrust portion 34 of said at least one brake pad 3 biasing said brake pad 3 at least away from said brake disc 2 in an axial direction A-A and in a radial direction R-R.

A third abutment portion 7 adapted to abut against said striker portion 35 of said at least one brake pad 3 forming a support on an area of said striker portion 35 which prevents any sliding of said second thrust portion 6 when the spring is subject to external actions; wherein said third abutment portion 7, when it rests abutting against said striker portion 35, is biased by a peak or buckling load.

In particular, it is avoided that said band spring 1 permanently engages with said at least one brake pad 3, avoiding a bilateral constraint in said second thrust portion 6 and third abutment portion 7 between said band spring 1 and said at least one brake pad 3.

According to an embodiment, said third abutment portion 7 extends cantilevered from said spring body 4.

According to an embodiment, said third abutment portion 7 comprises third abutment portion opposite flat faces 11, 12, and a third abutment portion edge 13.

According to an embodiment, said third abutment portion 7 rests abutting against said striker portion 35 with said third abutment portion edge 13.

According to an embodiment, said third abutment portion 7 comprises a boss-shaped protuberance body 22.

According to an embodiment, said third abutment portion 7 rests abutting against said striker portion 35 with said boss-shaped protuberance 22.

According to an embodiment, said thrust abutment portion 7 comprises a lateral and coplanar extension with the spring body 4 forming an abutment step 23 before connecting to said second thrust portion 6.

According to an embodiment, said third abutment portion 7 rests abutting against said striker portion 35 with said abutment step 23.

According to an embodiment, said at least one first engagement portion 5 and said at least one second thrust portion 6 are mutually distinct and separated by spring arm portions 14, 15, i.e., stretches of spring body 4 free of constraints, i.e., stretches of spring body 4 which avoid contacting both said caliper body 8 and said at least one brake pad 3.

According to an embodiment, a first spring body band 18 comprises a first connecting portion 20 from which two first spring arms 14 move away.

According to an embodiment, a second spring body band 19 comprises a second connecting portion 21 from which two second spring arms 15 move away.

According to an embodiment, said first connecting portion 20 of said first spring body band 18 is connected to said second connecting portion 21 of said second spring body band 19 to arrange said two first spring arms 14 separated by said two second spring arms 15.

According to an embodiment, a first spring body band 18 comprises a first connecting portion 20 from which two first spring arms 14 move away.

According to an embodiment, a second spring body band 19 comprises a second connecting portion 21 from which two second spring arms 15 move away.

According to an embodiment, said first connecting portion 20 of said first spring body band 18 is connected to said second connecting portion 21 of said second spring body band 19 to arrange said two first spring arms 14 orthogonal to said two second spring arms 15.

The present invention further relates to an assembly comprising at least one band spring 1 according to any one of the embodiments described above and at least one pad disc 3.

The present invention further relates to a method for elastically biasing at least one brake pad 3 away from a brake disc 2; wherein the method provides providing at least one band spring 1 shaped to straddle said brake disc 2 and having a band-shaped spring body 4; and wherein said brake disc 2 is adapted to rotate about a rotation axis X-X which defines an axial direction A-A parallel to said rotation axis X-X, a radial direction R-R, orthogonal to said rotation axis X-X, and a circumferential direction C-C orthogonal to said axial direction A-A and to said radial direction R-R;

said at least one brake pad 3 comprises a backing plate 31, which supports friction material 32, said backing plate 31 comprising a plate edge 33 which forms at least one thrust portion 34, and at least one distinct striker portion 35.

Said method further comprises the steps of:

coupling a first coupling portion 5 of said band spring 1 to a caliper body 8;

placing a second thrust portion 6 of said band spring 1 on said thrust portion 34 of said at least one brake pad 3 and applying said elastic action on said thrust portion 34 by biasing said brake pad 3 at least away from said brake disc 2 in an axial direction A-A and a radial direction R-R;

in case of external bias to the at least one band spring 1, make a third abutment portion 7 of said band spring 1 abut against said striker portion 35 of said at least one brake pad 3 forming a support on an area of said striker portion 35 and preventing any sliding of said second thrust portion 6 when the spring is subjected to said external actions;

biasing said third abutment portion 7, when it rests abutting against said striker portion 35 by a peak or buckling load;

avoiding that said band spring 1 permanently engages with said at least one brake pad 3, avoiding a bilateral constraint in said second thrust portion 6 and third abutment portion 7 between said band spring 1 and said at least one brake pad 3.

LIST OF REFERENCES

1 band spring
2 brake disc
3 brake pad
4 spring body
5 first coupling portion
6 second thrust portion
7 third abutment portion
8 caliper body
9 spring thickness
10 spring edge
11 third abutment portion flat face
12 third abutment portion flat face
13 third abutment portion edge
14 first spring arm or coupling spring arm
15 second spring arm or thrust spring arm
16 spring arm end or coupling spring arm end
17 spring arm end or thrust spring arm end
18 spring body first band
19 spring body second band
20 spring body first band first connection portion
21 spring body second band second connection portion
22 boss-shaped protuberance
23 abutment step

24 brake caliper
25 pad supporting and sliding pins
26 thrust elements or pistons
31 backing plate
32 friction material
33 plate edge
34 thrust portion
35 striker portion
X-X rotation axis or revolution axis of an axial-symmetrical surface
A-A axial direction
R-R radial direction
T-T tangential direction
C-C circumferential direction
A1 angle between second thrust portion and axial direction
A2 angle between second thrust portion and radial direction

The invention claimed is:

1. A band spring shaped to be arranged straddling a brake disc to apply an elastic action on at least one brake pad to bias the at least one brake pad away from said brake disc; wherein said brake disc is adapted to rotate about a rotation axis that defines an axial direction parallel to said rotation axis, a radial direction orthogonal to said rotation axis, and a circumferential direction orthogonal to said axial direction and to said radial direction;

said at least one brake pad comprises a backing plate that supports friction material, said backing plate comprising a plate edge that forms at least one thrust portion and at least one striker portion;

said band spring comprises a band-shaped spring body;

said band spring comprises at least three portions at least two of which are mutually distinct, namely a first coupling portion adapted to couple said band spring to a caliper body;

a second thrust portion adapted to apply an elastic action on said at least one thrust portion of said at least one brake pad biasing said at least one brake pad at least away from said brake disc in the axial direction and in the radial direction; and an initial gap between a third abutment portion and said at least one striker portion prior to an external action, wherein said third abutment portion is subsequently in direct facing contact with said at least one striker portion forming a support on an area of said striker portion that prevents sliding of said second thrust portion when the band spring is subject to said external action, wherein said third abutment portion when it rests abutting against said at least one striker portion, is biased by a peak or buckling load, avoiding that said band spring permanently couples with said at least one brake pad, avoiding a bilateral constraint in said second thrust portion and third abutment portion between said band spring and said at least one brake pad.

2. The band spring of claim 1, wherein said third abutment portion extends cantilevered from a spring arm.

3. The band spring of claim 1, wherein said third abutment portion comprises third abutment portion opposite flat faces and a third abutment portion edge, and wherein said third abutment portion rests abutting against said at least one striker portion with said third abutment portion edge.

4. The band spring of claim 1, wherein said third abutment portion comprises a boss-shaped protuberance, and wherein said third abutment portion rests abutting against said at least one striker portion with said boss-shaped protuberance.

5. The band spring of claim 1, wherein said third abutment portion comprises a lateral and coplanar extension with the band-shaped spring body that forms an abutment step before connecting to said second thrust portion, and wherein said third abutment portion rests abutting against said at least one striker portion with said abutment step.

6. The band spring of claim 1, wherein said first coupling portion and said second thrust portion are mutually distinct and separated by spring arm portions, namely stretches of the band-shaped spring body free of constraints that avoid contacting both said caliper body and said at least one brake pad.

7. The band spring of claim 1, wherein:

a first spring body band comprises a first connecting portion from which two first spring arms move away, wherein a second spring body band comprises a second connecting portion from which two second spring arms move away, and wherein said first connecting portion of said first spring body band is connected to said second connecting portion of said second spring body band to arrange said two first spring arms separated by said two second spring arms.

8. The band spring of claim 1, wherein:

a first spring body band comprises a first connecting portion from which two first spring arms move away, wherein a second spring body band comprises a second connecting portion from which two second spring arms move away, and wherein said first connecting portion of said first spring body band is connected to said second connecting portion of said second spring body band to arrange said two first spring arms orthogonal to said two second spring arms.

9. An assembly comprising:

at least one band spring according to claim 1; and at least one brake pad.

10. A method for elastically biasing at least one brake pad away from a brake disc; comprising providing at least one band spring shaped to straddle said brake disc and comprising a band-shaped spring body; wherein said brake disc is adapted to rotate about a rotation axis that defines an axial direction parallel to said rotation axis, a radial direction orthogonal to said rotation axis, and a circumferential direction orthogonal to said axial direction and to said radial direction;

said at least one brake pad comprises a backing plate that supports friction material, said backing plate comprising a plate edge that forms at least one thrust portion and at least one striker portion;

said method further comprising coupling a first coupling portion of said band spring to a caliper body;

placing a second thrust portion of said band spring on said at least one thrust portion of said at least one brake pad and applying an elastic action on said at least one thrust portion biasing said at least one brake pad at least away from said brake disc in the axial direction and in the radial direction;

providing an initial gap between a third abutment portion and said at least one striker portion prior to an external action on the band spring, closing said gap upon initiation of said external action to the band spring by moving said third abutment portion against said striker portion of said at least one brake pad forming a support on an area of said at least one striker portion and preventing sliding of said second thrust portion;

biasing said third abutment portion when said third abutment portion rests abutting against said at least one striker portion by a peak or buckling load;

avoiding that said band spring permanently engages with said at least one brake pad, avoiding a bilateral constraint in said second thrust portion and third abutment portion between said band spring and said at least one brake pad.

* * * * *